(12) United States Patent
Ohshima (10) Patent No.: US 9,485,431 B2
(45) Date of Patent: Nov. 1, 2016

(54) IMAGE CAPTURING APPARATUS AND METHOD FOR CONTROLLING THE SAME

(71) Applicant: CANON KABUSHIKI KAISHA, Tokyo (JP)

(72) Inventor: Hideaki Ohshima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/594,471

(22) Filed: Jan. 12, 2015

(65) Prior Publication Data

US 2015/0201131 A1    Jul. 16, 2015

(30) Foreign Application Priority Data

Jan. 14, 2014  (JP) ................. 2014-004307

(51) Int. Cl.
*H04N 5/222*    (2006.01)
*H04N 5/232*    (2006.01)

(52) U.S. Cl.
CPC ...... *H04N 5/23293* (2013.01); *H04N 5/23203* (2013.01); *H04N 5/23241* (2013.01)

(58) Field of Classification Search
CPC ............. H04N 5/23293; H04N 5/23203; H04N 5/23241

USPC ............ 348/333.01–333.09, 333.11–333.13
See application file for complete search history.

(56) References Cited

U.S. PATENT DOCUMENTS

2010/0261506 A1* 10/2010 Rajamani ............ H04M 1/7253
                                                                  455/566
2014/0379951 A1* 12/2014 Taki ...................... G06F 1/1632
                                                                  710/303

FOREIGN PATENT DOCUMENTS

JP         2007336526 A    12/2007

* cited by examiner

*Primary Examiner* — Yogesh Aggarwal
(74) *Attorney, Agent, or Firm* — Canon U.S.A., Inc. IP Division (57) ABSTRACT

An image capturing apparatus includes an image capturing unit configured to capture an image of a subject to generate image data; a detachable display unit configured to display the image data generated by the image capturing unit; a wireless communication unit configured to connect with a second device including the display unit via wireless communication; a detection unit configured to detect attachment/detachment of the display unit; and a control unit configured to control the wireless communication unit in order that connection to one of the display unit and the second device is given priority depending on the attachment/detachment of the display unit detected by the detection unit.

9 Claims, 7 Drawing Sheets

IMAGE CAPTURING APPARATUS AND METHOD FOR CONTROLLING THE SAME

BACKGROUND OF THE INVENTION

1. Field of the Invention

The present invention relates to an image capturing apparatus and a method for controlling the image capturing apparatus, and in particular, it relates to a technique suitable for use in controlling an image capturing apparatus, which can be separated into an image capturing unit and a display unit, depending on whether they are connected together.

2. Description of the Related Art

A method for wirelessly transmitting and receiving images taken by a camera or playback images between the camera and a monitor separated therefrom has been proposed in the related art. For example, Japanese Patent Laid-Open No. 2007-336526 discloses a digital camera to which a display unit is detachably attached and which can wirelessly transmit captured-image data to a display unit.

Meanwhile, in recent years, an increasing number of peripheral devices, so-called accessories, of digital cameras are also equipped with wireless capability and are capable of wireless communication with the digital cameras. However, such current circumstances are not taken into consideration in Japanese Patent Laid-Open No. 2007-336526, described above.

In other words, the above disclosure takes no thought of which device is given priority as a device to be connected to the digital camera. This may require much time and effort for the user to select a device for which wireless communication is to be established or may hinder user's intended operation.

SUMMARY OF THE INVENTION

The present invention provides an image capturing apparatus including an image capturing unit configured to capture an image of a subject to generate image data; a detachable display unit configured to display the image data generated by the image capturing unit; a wireless communication unit configured to connect with a second device including the display unit via wireless communication; a detection unit configured to detect attachment/detachment of the display unit; and a control unit configured to control the wireless communication unit in order that connection to one of the display unit and the second device is given priority depending on the attachment/detachment of the display unit detected by the detection unit.

Further features of the present invention will become apparent from the following description of exemplary embodiments with reference to the attached drawings.

DESCRIPTION OF THE EMBODIMENTS

Embodiments of the present invention will be described in detail hereinbelow with reference to the attached drawings.

Figure 1:
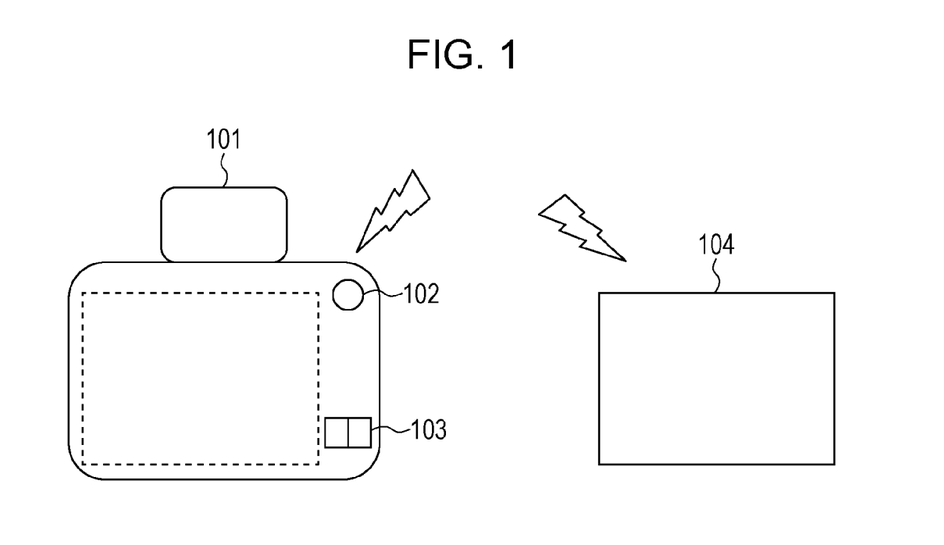
FIG. 1 is a diagram showing a connecting configuration of an image capturing unit and a display unit separated from each other in an embodiment of the present invention.

FIG. 1 is a diagram showing a connecting configuration of an image capturing unit and a display unit separated from each other according to an embodiment of the present invention.

First Embodiment

FIG. 1 is a diagram showing a case in which an image capturing unit 101 equipped with a wireless communication unit and a display unit 104 are detachably connected via wireless communication to configure a network. The image capturing unit 101 includes a wireless-communication stating member 102 and a power switch 103. This uses IEEE802.11 ad hoc mode wireless communication, in which either of the units may serve as an access point.

Figure 2:
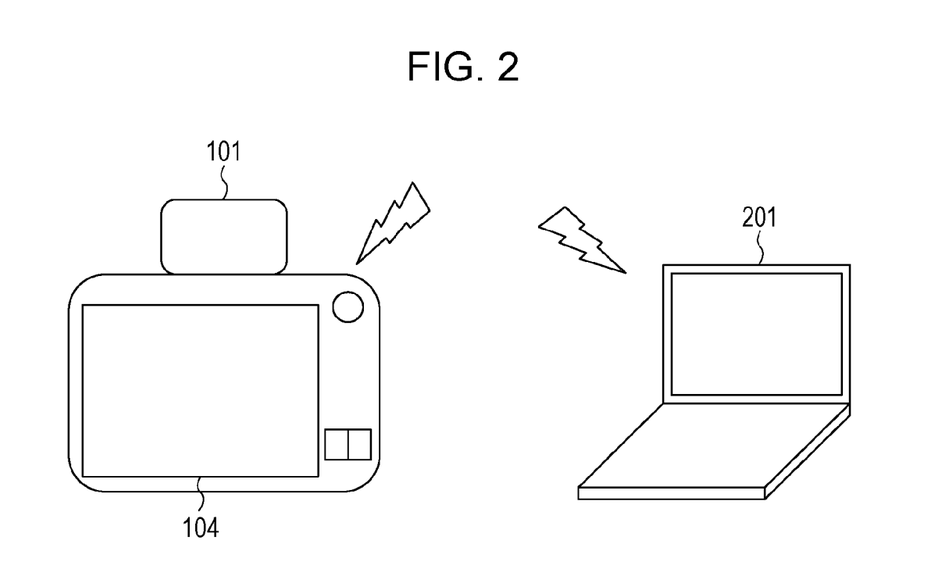
FIG. 2 is a diagram showing a connection with an external device in a case in which the image capturing unit and the display unit are integrated with each other in an embodiment.

FIG. 2 is a diagram showing a network connection with an external device 201 in a case in which the image capturing unit 101 equipped with a wireless communication unit and the display unit 104 are integrated with each other.

Figure 3:
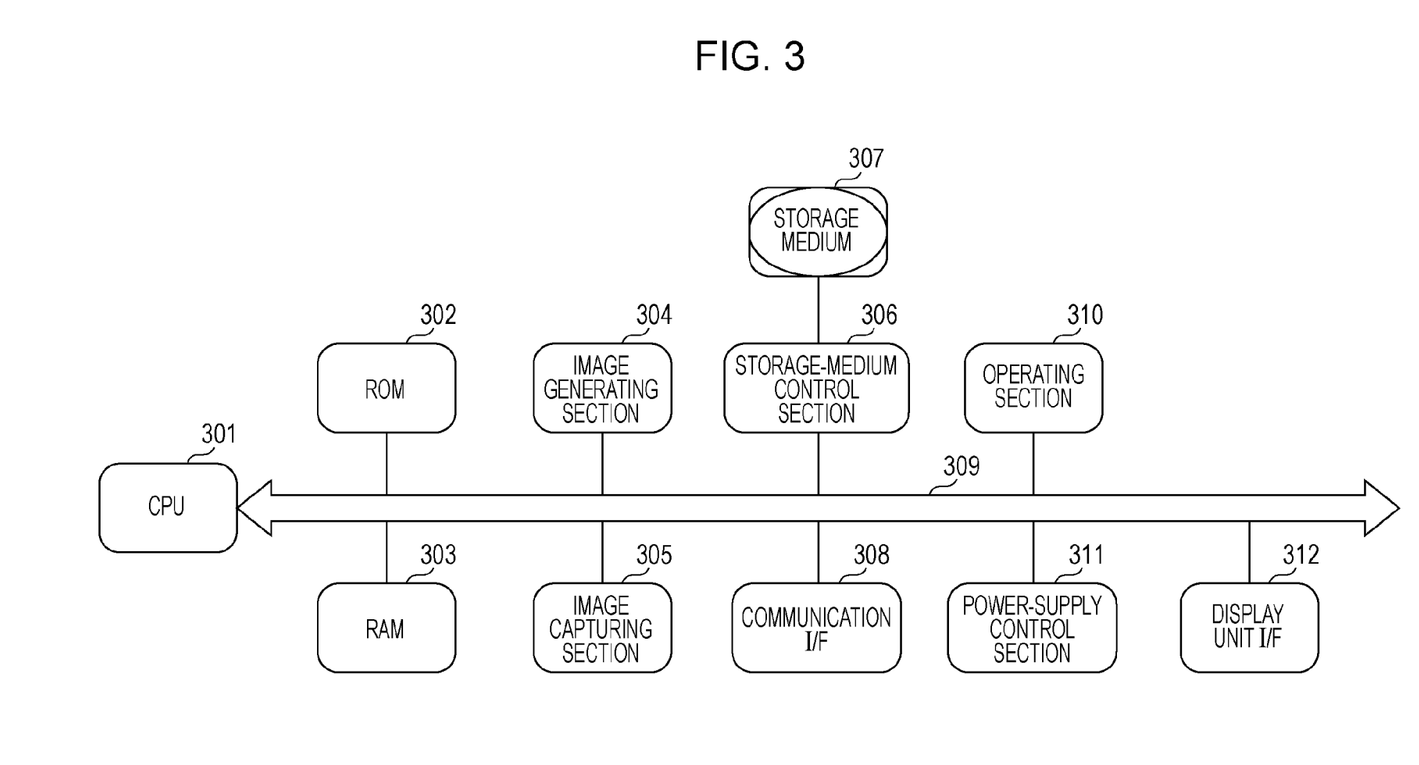
FIG. 3 is a block diagram showing an example of the hardware configuration of the image capturing unit in an embodiment.

FIG. 3 is a block diagram showing an example of the hardware configuration of the image capturing unit 101.

The image capturing unit 101 includes a system bus 309 and the following elements connected to the system bus 309.

A CPU 301 controls the overall image capturing unit 101 by executing control programs stored in a ROM 302.

The ROM 302 is a non-volatile memory that stores the above-mentioned programs and so on.

A RAM 303 is a volatile memory for use as a work area when the CPU 301 executes the control programs. The RAM 303 is also used as an area for temporarily buffering captured images before they are stored in a storage medium 307.

An image generating section 304 performs image generating processes, such as JPEG coding and MPEG coding, on digital electrical signals that an image capturing section 305 stores in the RAM 303 to generate image data. The image generating section 304 performs image generating processes on images stored in the storage medium 307 also when editing the images to generate image data.

The image capturing section 305 includes an optical lens, a CMOS, an AD converter, and so on. The image capturing section 305 converts light entering through the optical lens to a digital electrical signal and stores it in the RAM 303. The mage capturing section 305 reflects light incident on a finder (not shown) through the optical lens with a mirror and displays the light through a pentaprism. The finder displays image capturing parameters and other information. In this embodiment, the finder also displays information indicating whether the image capturing unit 101 is connected to the display unit 104.

A storage-medium control section 306 controls the storage medium 307, described below.

The storage medium 307 is a device for storing image data, for example, CompactFlash® and a hard disk.

A communication I/F 308 is an interface for communicating with an external device, for example, a wireless LAN and Bluetooth®. In this embodiment, a wireless LAN is used by way of example.

An operating section 310 includes a shutter button, an arrow key, an enter button, a menu button, a power button, and so on. The shutter button takes two states, half press ((SW1) and full press (SW2), depending on the pressing operation. The arrow key is used, for example, for selecting image data. The enter button is used for determining an option item. The user can give an instruction to the image capturing unit 101 using the operating section 310.

A power-supply control section 311 supplies power to the image capturing unit 101 and is given information on the remaining buttery level and so on by the CPU 301.

A display unit I/F 312 is an interface for communication when the image capturing unit 101 is integrated with the display unit 104. An example of the display unit I/F 312 is an electrical connector.

Figure 4:
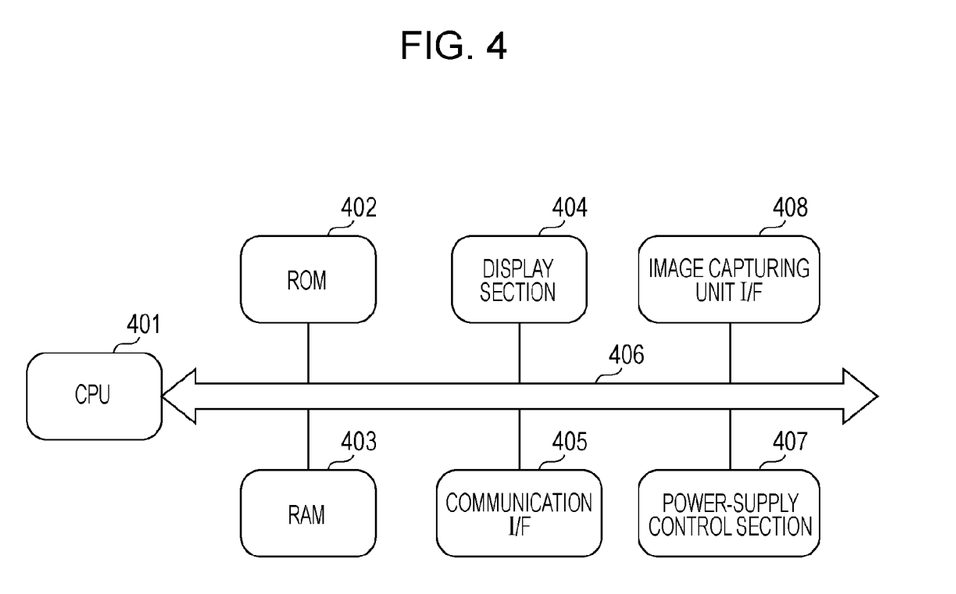
FIG. 4 is a block diagram showing an example of the hardware configuration of the display unit in an embodiment.

FIG. 4 is a block diagram showing an example of the hardware configuration of the display unit 104.

The display unit 104 includes a system bus 406 and the following elements connected to the system bus 406.

A CPU 401 controls the overall display unit 104 by executing control programs stored in a ROM 402.

The ROM 402 is a non-volatile memory that stores the above programs.

A RAM 403 is a volatile memory for use as a work area when the CPU 401 executes the control programs.

A communication I/F 405 is an interface for communication with an external device, for example, a wireless LAN and Bluetooth®. In this embodiment, a wireless LAN is used by way of example.

A power-supply control section 407 supplies power to the display unit 104 and is given information on the remaining battery levels and so on by the CPU 401.

An image capturing unit I/F 408 is an interface for communication when the display unit 104 and the image capturing unit 101 are integrated. An example of the image capturing unit I/F 408 is an electrical connector.

A display section 404 displays an image captured by the image capturing section 305 or an image played back from the storage medium 307 when connected to the image capturing unit 101 via the communication I/F 405 or the image capturing unit I/F 408. The display section 404 also displays a GUI corresponding to an instruction using the operating section 310.

Figure 5:
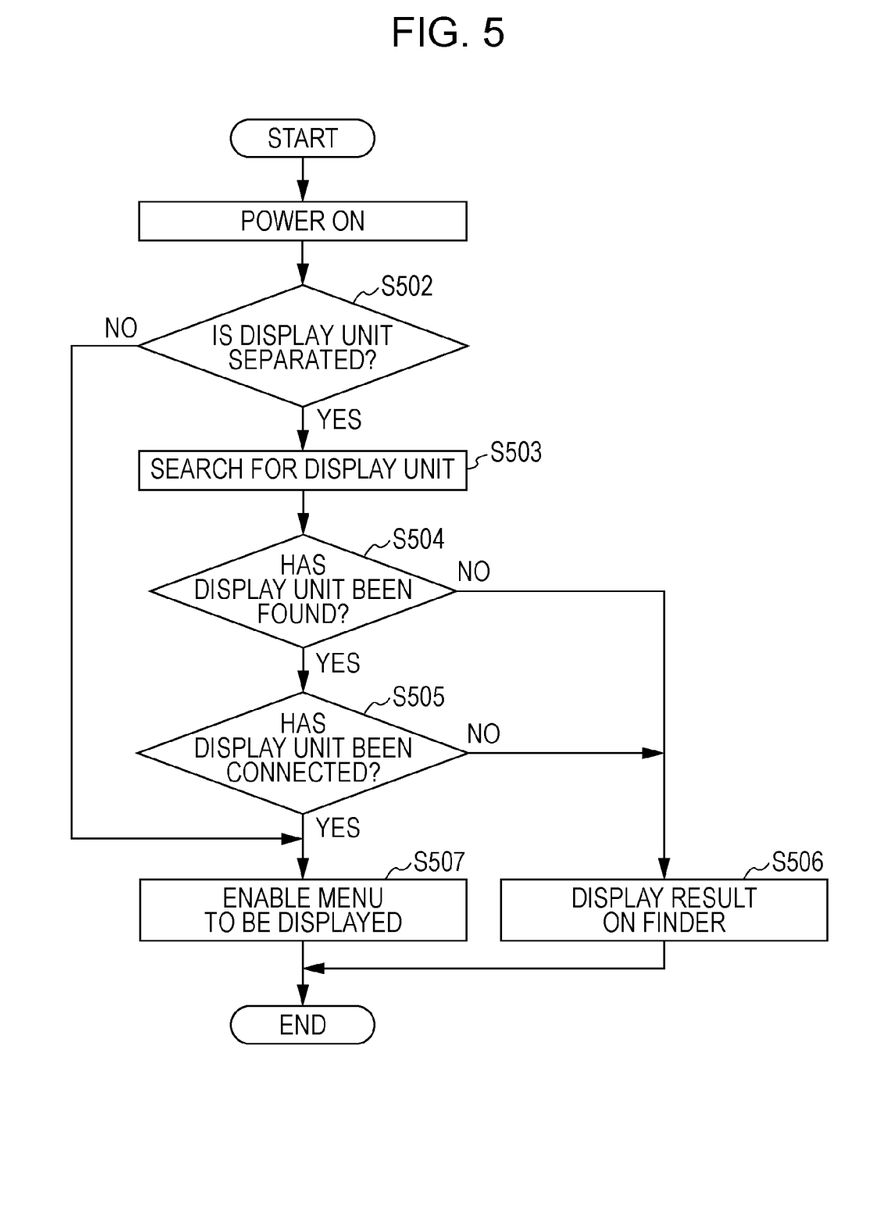
FIG. 5 is a flowchart showing a starting operation in a first embodiment of the present invention.

Referring now to FIG. 5, a starting operation at power ON, which is a feature of this embodiment, will be described. The flowchart in FIG. 5 is started when the power switch 103, which is part of the operating section 310, is operated at the image capturing unit 101, so that power is supplied to the components of the image capturing unit 101 from the power-supply control section 311.

At S502, when the image capturing unit 101 is supplied with power, the CPU 301 determines whether the display unit 104 is connected thereto via the display unit I/F 312. As a result of the determination, if the image capturing unit 101 is not separated from the display unit 104 but is connected thereto via the display unit I/F 312, the process goes to S507 to enable a menu to be displayed. If the image capturing unit 101 is separated from the display unit 104, the process goes to S503.

At S503, the CPU 301 searches for the display unit 104 using a predetermined wireless parameter via the communication I/F 308. The search is performed using a service set identifier (SSID), which is one of predetermined wireless parameters. For ad hoc communication (wireless LAN ad hoc mode communication), a predetermined channel is used to allow an efficient search by searching for the SSID using the specified channel. The SSID is generally included in beacon signals transmitted at regular intervals from a so-called access point. Devices connected to the access point find the SSID by receiving the beacon signals. However, in this embodiment, it is determined in advance that the image capturing unit 101 and the display unit 104 are to use a common SSID, so that a search signal is transmitted without passing through the process of narrowing the communication target using beacon signals or the like.

At S504, the CPU 301 determines whether the display unit 104 has been found via the communication I/F 308. Specifically, when receiving a response to the transmitted search signal from the display unit 104, the CPU 301 determines that the display unit 104 has been found. If the display unit 104 has been found, the process goes to S505. If the display unit 104 has not been found, the process goes to S506.

At S505, the CPU 301 performs a process for connecting with the display unit 104 via the communication I/F 308 using a predetermined wireless parameter. If the connection has been established, the process goes to S507. If the connection has not been established, the process goes to S506.

If the image capturing unit 101 and the display unit 104 are separated and are not connected together in a predetermined time, then at S506, the CPU 301 displays the result on the finder of the image capturing unit 101. Examples of the indication include a connection mark and any other indications that user can understand. Thereafter, the process of this flowchart ends.

Since, at S507, the display unit 104 has been connected, the display section 404 of the display unit 104 is enabled to display a menu. Thereafter, the process of the flowchart ends.

The foregoing flowchart is executed in parallel with a process of starting an image capturing mode or a playback mode that is started when power is turned on.

As described above, the start-up operation at power ON is switched depending on whether the image capturing unit 101 and the display unit 104 are integrated or separated when the image capturing unit 101 is supplied with power. This allows the user to operate the image capturing apparatus without consciousness while using the display section 404 of the display unit 104.

Second Embodiment

Figure 6:
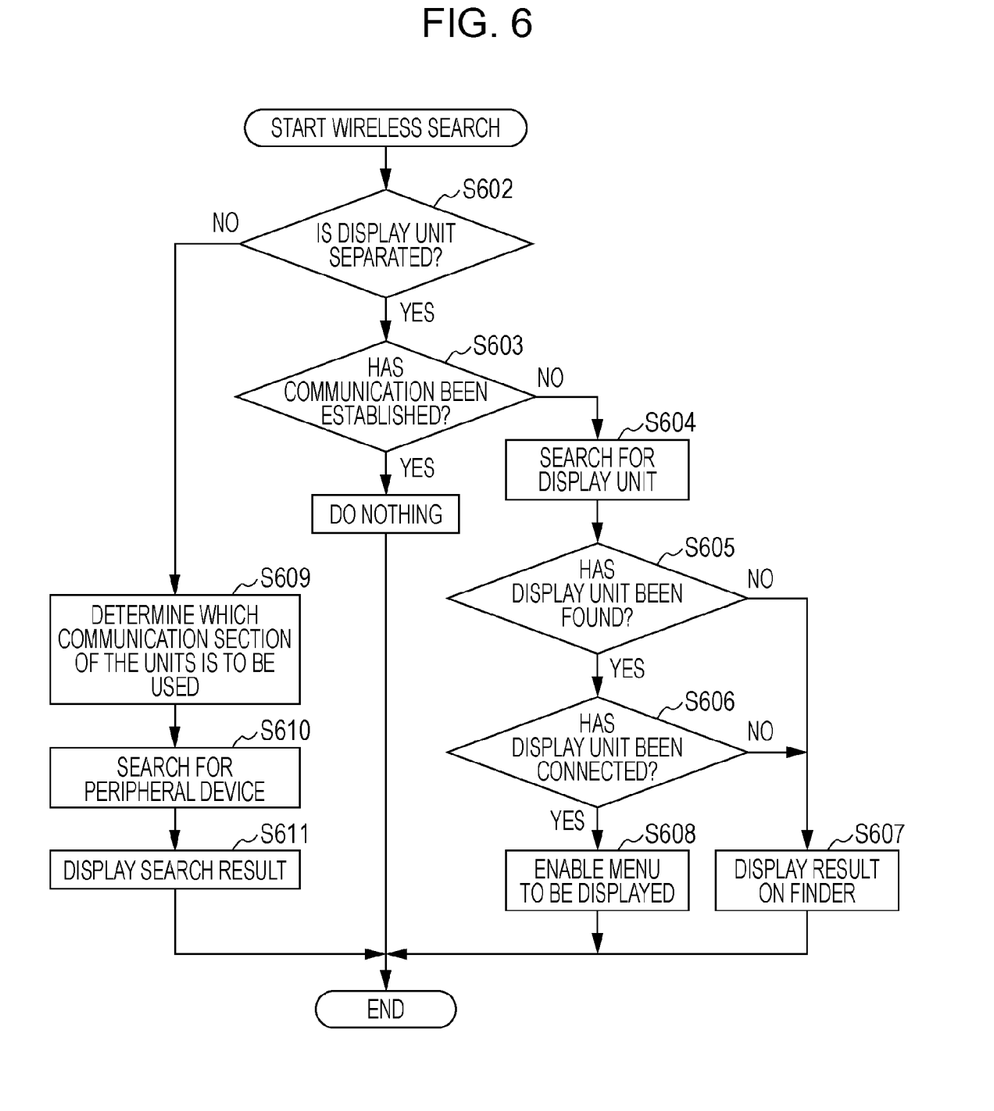
FIG. 6 is a flowchart showing a wireless search and a connecting method according to a second embodiment of the present invention.

Referring to FIG. 6, a wireless search and a method for connection according to a second embodiment of the present invention will be described.

The feature described below is to change the operation depending on whether the image capturing unit 101 and the display unit 104 are integrated or separated when the wireless-communication stating member 102 is operated.

The flowchart in FIG. 6 is started when the wireless-communication starting member 102, which is part of the operating section 310, is operated at the image capturing unit 101.

First, at S602, the CPU 301 determines whether the image capturing unit 101 and the display unit 104 are connected via the display unit I/F 312. As a result of the determination, if the image capturing unit 101 is not separated from the display unit 104 but is connected to the display unit 104 via the display unit I/F 312, the process goes to S609. If the image capturing unit 101 and the display unit 104 are separated, the process goes to S603.

At S603, since the image capturing unit 101 and the display unit 104 are separated, the CPU 301 determines whether communication between the image capturing unit 101 and the display unit 104 has been established via the communication I/F 308. If communication has already been established, nothing is done, the process ends. If communication has not been established, the process goes to S604.

At S604, the CPU 301 searches for the display unit 104 using a predetermined wireless parameter via the communication I/F 308. The search is performed using an SSID, which is one of predetermined wireless parameters. For ad hoc communication, a predetermined channel is used to allow a faster search by searching for the SSID using the specified channel.

At S605, the CPU 301 determines whether the display unit 104 has been found via the communication I/F 308. As a result, if the display unit 104 has been found, the process goes to S606. If the display unit 104 has not been found, the process goes to S607.

At S606, since the display unit 104 was found at S605, the CPU 301 connects to the display unit 104 using a predetermined wireless parameter via the communication I/F 308. If the connection has been completed, the process goes to S608. If the connection has not been completed, the process goes to S607.

If the image capturing unit 101 and the display unit 104 are separated and are not connected together in a predetermined time, then at S607, the CPU 301 displays the result on the finder of the image capturing unit 101. Examples of the indication include a connection mark and any other indications that user can understand. Thereafter, the process of this flowchart ends.

Since, at S608, the display unit 104 has been connected, the display section 404 of the display unit 104 is enabled to display a menu. Thereafter, the process of the flowchart ends.

On the other hand, at S609, the CPU 301 determines which of the communication I/F 308 of the image capturing unit 101 and the communication I/F 405 of the display unit 104 is to be used for communication. For the determination, the CPU 301 may compare a remaining battery level obtained from the power-supply control section 311 of the image capturing unit 101 with a remaining battery level obtained from the power-supply control section 407 of the display unit 104 and select one at a higher level. Alternatively, the user may make a selection. A communication I/F to be used is determined in accordance with the above determination, and the process goes to S610.

At S610, a peripheral device is searched for using the communication I/F determined at S609, and the process goes to S611.

At S611, information on the peripheral device (external device 201) found at S610 is displayed on the display section 404 of the display unit 104. Thereafter, the process of the flowchart ends.

From then on, communication with the external device 201 is enabled by establishing communication therewith using the screen.

As described above, when the wireless-communication starting member 102 is operated in a state in which the image capturing unit 101 is not connected to the display unit 104, connection with the display unit 104 is given priority over peripheral devices. This allows user-intended wireless search and connection, thus enhancing the convenience.

Third Embodiment

Figure 7A:
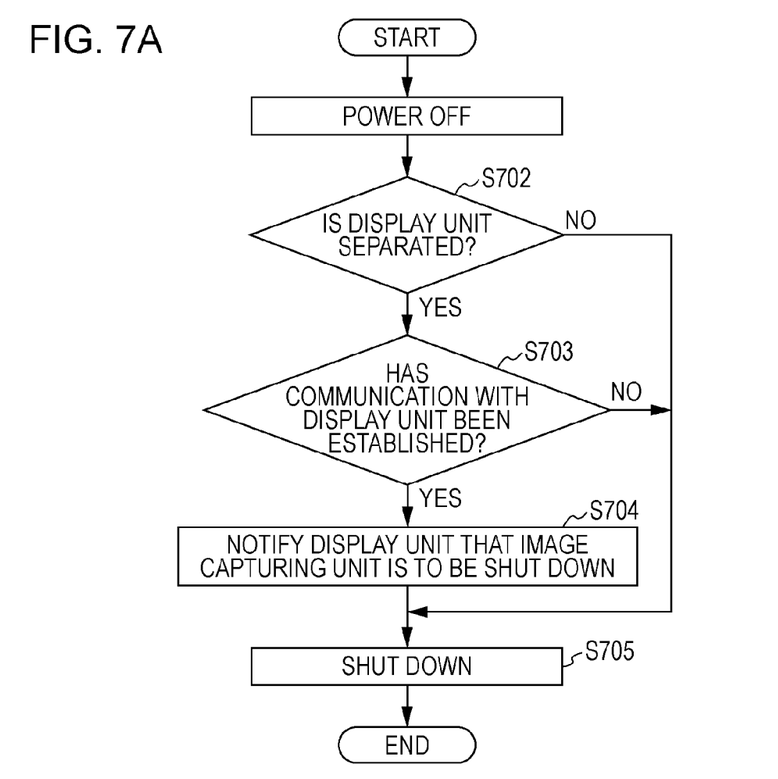
FIG. 7A is a flowchart showing a shutdown process at the image capturing unit according to a third embodiment of the present invention.
Figure 7B:
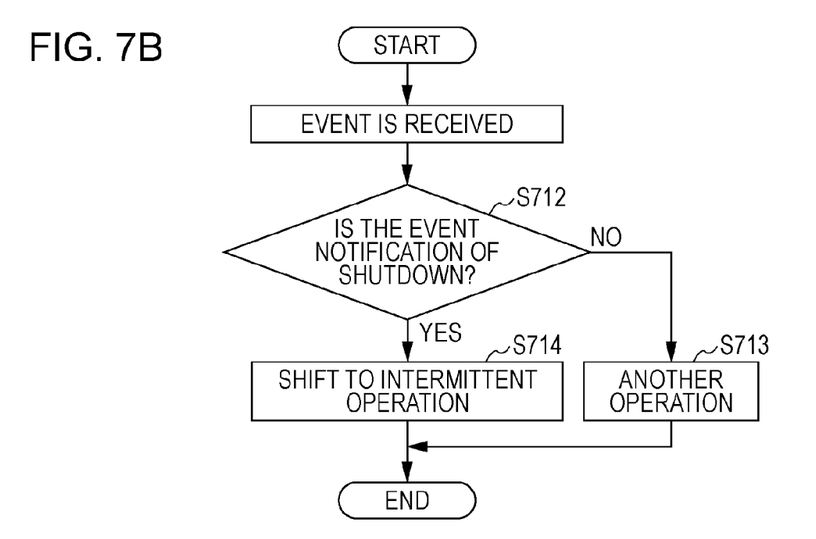
FIG. 7B is a flowchart showing a shutdown process at the display unit according to the third embodiment.

Referring to FIGS. 7A and 7B, control at power-off in a state in which the image capturing unit 101 and the display unit 104 are separated, according to a third embodiment of the present invention, will be described hereinbelow.

FIG. 7A is a flowchart showing a shutdown process by turning off the power at the image capturing unit 101.

This flowchart is started when an instruction to turn off the power by an operation on the power switch 103, which is part of the operating section 310, at the image capturing unit 101 is received.

First, at S702, the CPU 301 determines whether the image capturing unit 101 and the display unit 104 are connected via the display unit I/F 312. As a result of the determination, if the image capturing unit 101 is not separated from the display unit 104 but is connected to the display unit 104 via the display unit I/F 312, the process goes to S705. If the image capturing unit 101 and the display unit 104 are separated, the process goes to S703.

At S703, the CPU 301 determines whether communication between the image capturing unit 101 and the display unit 104 has been established via the communication I/F 308. As a result of the determination, if communication between the image capturing unit 101 and the display unit 104 via the communication I/F 308 has not been established, the process goes to S705. If communication between the image capturing unit 101 and the display unit 104 via the communication I/F 308 has been established, the process goes to S704.

At S704, the CPU 301 sends a shutdown notification to the display unit 104 via the communication I/F 308 of the image capturing unit 101.

At S705, the CPU 301 performs a process of shutting down the image capturing unit 101 to stop power supply to the components of the image capturing unit 101.

FIG. 7B is a flowchart showing a shutdown process at the display unit 104, corresponding to the process in FIG. 7A.

This flowchart is started when the CPU 401 of the display unit 104 receives an event from the image capturing unit 101 via the communication I/F 405.

First, at S712, the CPU 401 determines the details of the received event. As a result of the determination, if it is a shutdown notification, the process goes to S714. If it is not a shutdown notification but another process notification, the process goes to S713 to perform a process corresponding to the notification.

At S713, the CPU 401 performs the process corresponding to the received event.

At S714, the CPU 401 performs an intermittent wireless communication in response to the reception of the shutdown notification from the image capturing unit 101. Specifically, the CPU 401 operates so as to alternately repeat a stand-by mode in which the display unit 104 can respond to a connection request from the image capturing unit 101 and a sleep mode in which the display unit 104 cannot respond to a connection request from the image capturing unit 101. This operation is referred to as an intermittent wireless communication operation in a sense that the display unit 104 intermittently enters a stand-by mode in which the display unit 104 can respond to a connection request from the image capturing unit 101 (a radio-signal receivable mode). The period of the stand-by mode and the period of the sleep mode may be set to either predetermined fixed values or any values set by the user. The period during which an intermittent operation is continued may be limited. In other words, if no connection request is issued from the image capturing unit 101 even after a lapse of a set period of time after receiving a shutdown notification and shifting to the intermittent operation, the intermittent wireless communication operation may be stopped, and the power to the display unit 104 may be turned off.

In the above operation, when the power to the image capturing unit 101 is turned off, a shutdown notification is issued from the image capturing unit 101 to the display unit 104, and the display unit 104 performs the intermittent wireless communication operation. This allows quick connection even after the user turns on the power to the image capturing unit again. This allows the user to connect the image capturing unit 101 to the display unit 104 unintentionally, thus enhancing the convenience.

Fourth Embodiment

Figure 8:
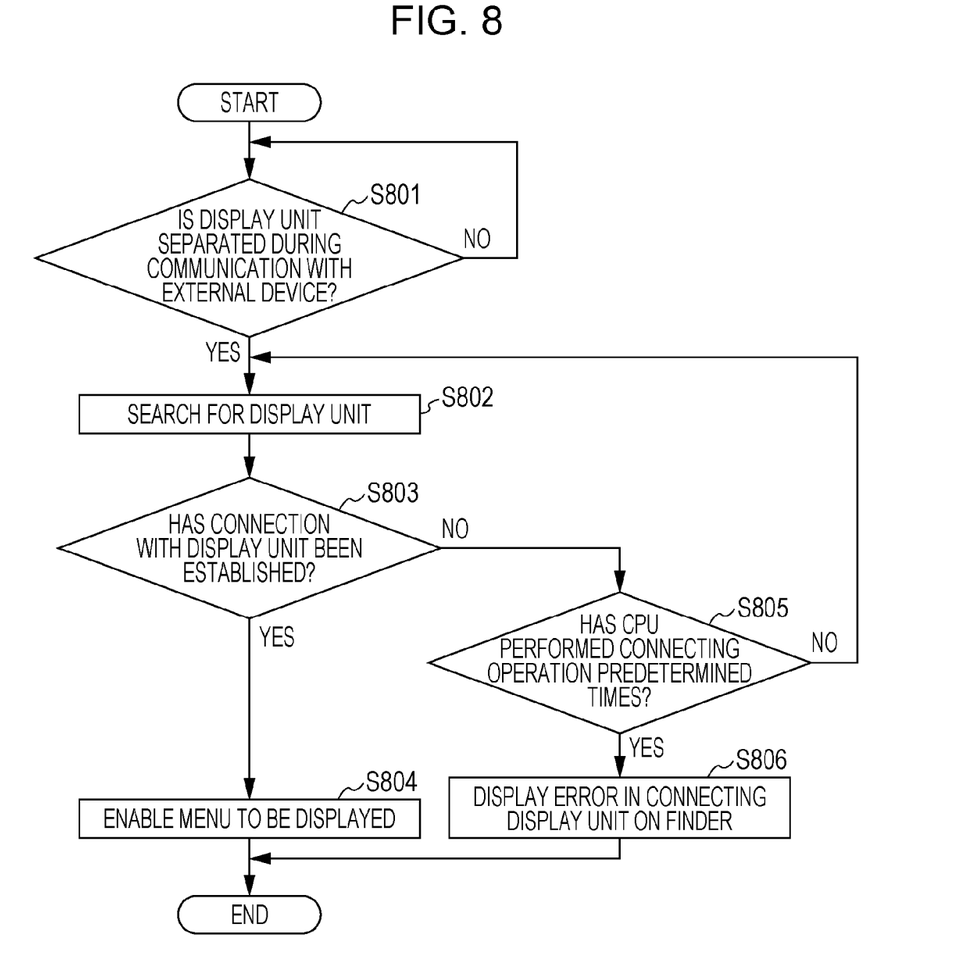
FIG. 8 is a flowchart illustrating an operation when the display unit is separated from the image capturing unit during communication with an external device according to a fourth embodiment of the present invention.

Referring to FIG. 8, an operation during communication with the external device 201 according to a fourth embodiment of the present invention will be described.

FIG. 8 is a flowchart illustrating an operation when the display unit 104 is separated from the image capturing unit 101 during communication with the external device 201.

At S801, the CPU 301 determines whether the image capturing unit 101 is connected to the display unit 104 via the display unit I/F 312 during communication with the external device 201. As a result of the determination, if the image capturing unit 101 and the display unit 104 are separated, the process goes to S802.

At S802, the CPU 301 cuts the connection to the external device 201 and searches for the display unit 104.

At S803, the CPU 301 determines whether connection between the image capturing unit 101 and the display unit 104 via the communication I/F 308 has been completed. As a result of the determination, if the connection has been completed, the process goes to S804. If the connection has not been established, the process goes to S805.

At S804, since the connection between the image capturing unit 101 and the display unit 104 has been completed in a state in which they are separated, the display section 404 of the display unit 104 is enabled to display a menu. Thereafter, the process of this flowchart ends.

At S805, since the connection between the image capturing unit 101 and the display unit 104 has not been completed in a state in which they are separated, the CPU 301 determines whether a predetermined number of connecting operations have been performed. Specifically, the CPU 301 determines whether the number of searching operations at step S802 after it is determined at S801 that the image capturing unit 101 and the display unit 104 are separated has reached the predetermined number. If the predetermined number of connecting operations have not been performed, the process returns to S802, and the process from S802 to S805 is repeated. If the predetermined number of connecting operations have been performed, the CPU 301 determines that connection to the display unit 104 is impossible, and the process goes to S806.

At S806, the CPU 301 displays an indication that the connection has failed on a display device, such as a finder of the image capturing unit 101. Not the display device but a light-emitting device, such as an LED, may be used for notifying the user. Thereafter, the process of the flowchart ends.

The foregoing process can minimize, when the display unit 104 is separated from the image capturing unit 101 while the image capturing unit 101 is connected to the external device 201, a state in which the user cannot use the display unit 104 by giving priority to connection to the display unit 104. Although not shown in the embodiment, if the image capturing unit 101 and the external device 201 are halfway through transfer of data, the above-described operation may be performed after completion of the transfer.

Although the above embodiments show a case in which the display unit 104 is separated from the image capturing unit 101, the present invention can be applied to a case in which the image capturing unit 101 and an external device including a display unit can be integrated. An example of the external device including a display unit is a smart phone.

The fourth embodiment has been described using an example in which, when the display unit 104 is separated while the image capturing unit 101 is communicating with the external device 201, the connection with the external device 201 is automatically terminated. However, there may be a case in which the user gives a higher priority to connection with the external device 201. Thus, even if the display unit 104 is separated while the image capturing unit 101 is communicating with the external device 201, the connection with the external device 201 may be maintained, and when the user operates the wireless-communication starting member 102 in this state, the process may go to S802. In other words, the user may be enabled to indicate user's intention to give a higher priority to the display unit 104 over the external device 201 using the operation on the wireless-communication starting member 102. If the connection cannot be established although the display unit 104 is searched for using an operation on the wireless-communication starting member 102 as a trigger, the image capturing unit 101 may be connected to the external device 201 again. This further enhances the usability.

While embodiments of the present invention have been described, the present invention is not limited to the embodiments, and various modifications and changes can be made in the scope of the spirit of the invention.

Other Embodiments

The present invention can be implemented by executing the following process. Specifically, software (computer programs) for implementing the functions of the above embodiments is provided to a system or device via a network or various kinds of computer-readable storage media. Then, a computer (or CPU, MPU, etc.) of the system or device reads the programs.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-004307, filed Jan. 14, 2014, which is hereby incorporated by reference herein in its entirety.

What is claimed is:

1. An image capturing apparatus comprising:
   an image capturing unit configured to capture an image of a subject to generate image data;
   a detachable display unit configured to display the image data generated by the image capturing unit;
   a wireless communication unit configured to connect with a second device including the display unit via wireless communication;
   a detection unit configured to detect attachment/detachment of the display unit; and
   a control unit configured to control the wireless communication unit in order that connection to one of the display unit and the second device is given priority depending on the attachment/detachment of the display unit detected by the detection unit,
   wherein when wireless communication is performed in a state in which the image capturing apparatus and the display unit are separated, and communication has not been established, the control unit controls the wireless communication unit so as to give priority to wireless communication with the display unit.

2. The image capturing apparatus according to claim 1, wherein when turning off power to the image capturing apparatus, the control unit controls the wireless communication unit so as to send a notification that the power to the image capturing unit is turned off to the display unit.

3. The image capturing apparatus according to claim 2, wherein when receiving the notification that the power is turned off, the display unit performs an operation for intermittently entering a mode in which a radio signal coming from the image capturing unit can be received.

4. The image capturing apparatus according to claim 1, wherein when the display unit is separated in a state in which the image capturing apparatus connects to the second device via the wireless communication unit, the control unit controls the wireless communication unit so as to establish wireless communication with the display unit.

5. The image capturing apparatus according to claim 1, wherein when the display unit is separated in a state in which the image capturing apparatus connects to the second device via the wireless communication unit, the control unit controls the wireless communication unit so as to disconnect communication with the second device and establish wireless communication with the display unit.

6. The image capturing apparatus according to claim 1, wherein when a wireless search is performed in a state in which the image capturing apparatus and the display unit are integrated, the control unit controls the wireless communication unit so as to establish wireless communication with the second device.

7. The image capturing apparatus according to claim 1, wherein when a wireless search is performed in a state in which the image capturing apparatus and the display unit are integrated, the second device is connected using the wireless communication unit of the image capturing apparatus or the display unit, whichever has a higher remaining battery level.

8. A method for controlling an image capturing apparatus, comprising the steps of:
   capturing an image of a subject to generate image data;
   connecting, via wireless communication, with a second device including a detachable display unit that displays the image data generated in the image capturing step;
   detecting attachment/detachment of the display unit; and
   controlling the wireless communication step in order that connection to one of the display unit and the second device is given priority depending on the attachment/detachment of the display unit detected in the detecting step,
   wherein when wireless communication is performed in a state in which the image capturing apparatus and the display unit are separated, and communication has not been established, controlling the wireless communication step so as to give priority to wireless communication with the display unit.

9. A computer-readable non-transitory storage medium storing computer-executable instructions, the computer-executable instructions causing a computer to execute the method according to claim 8.

* * * * *